May 26, 1942.  J. C. NEWTON  2,284,298
SERVO SYSTEM FOR AIRPLANES AND OTHER VEHICLES
Filed Dec. 21, 1939  4 Sheets-Sheet 2
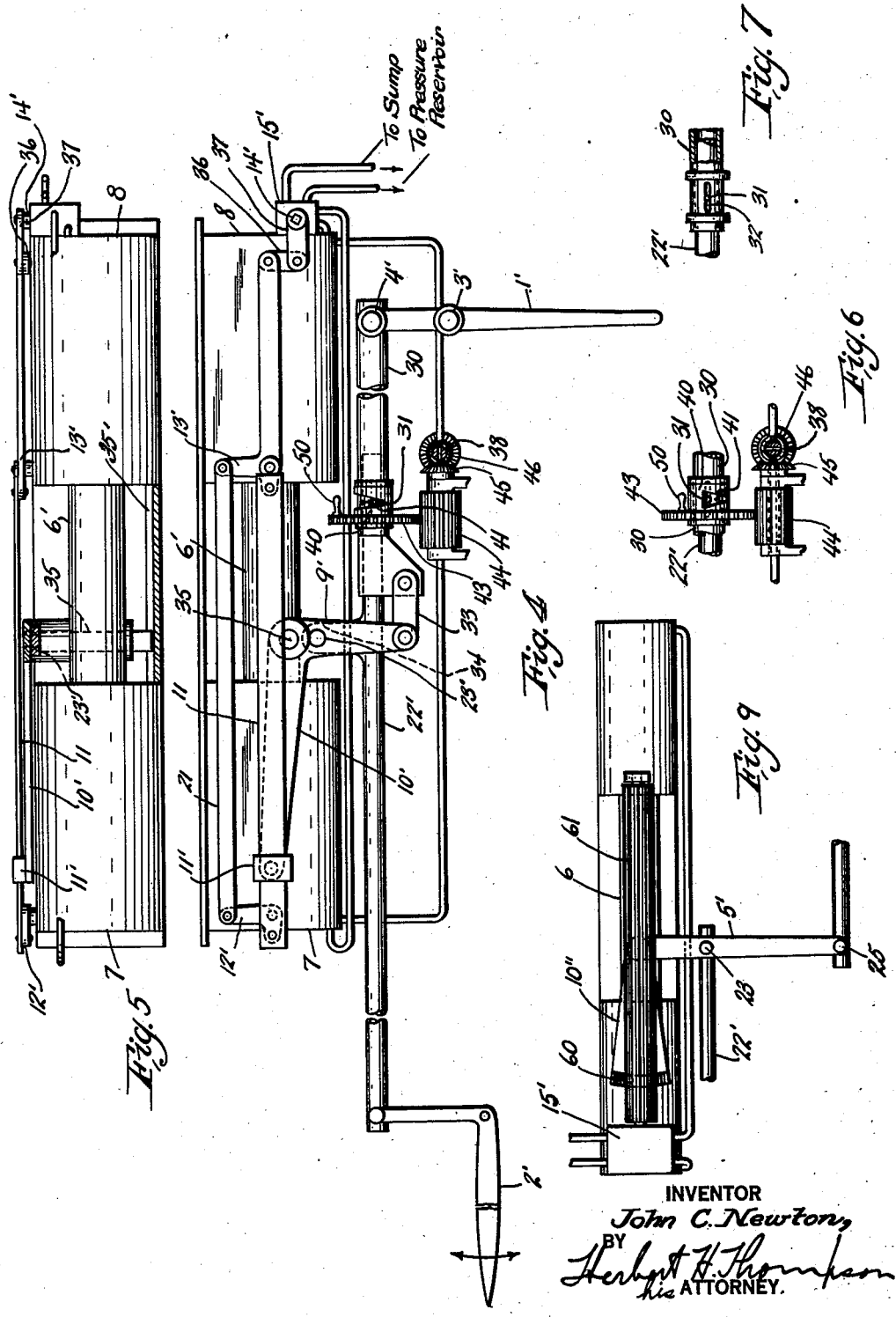
INVENTOR
John C. Newton,
BY
Herbert H. Thompson
his ATTORNEY.

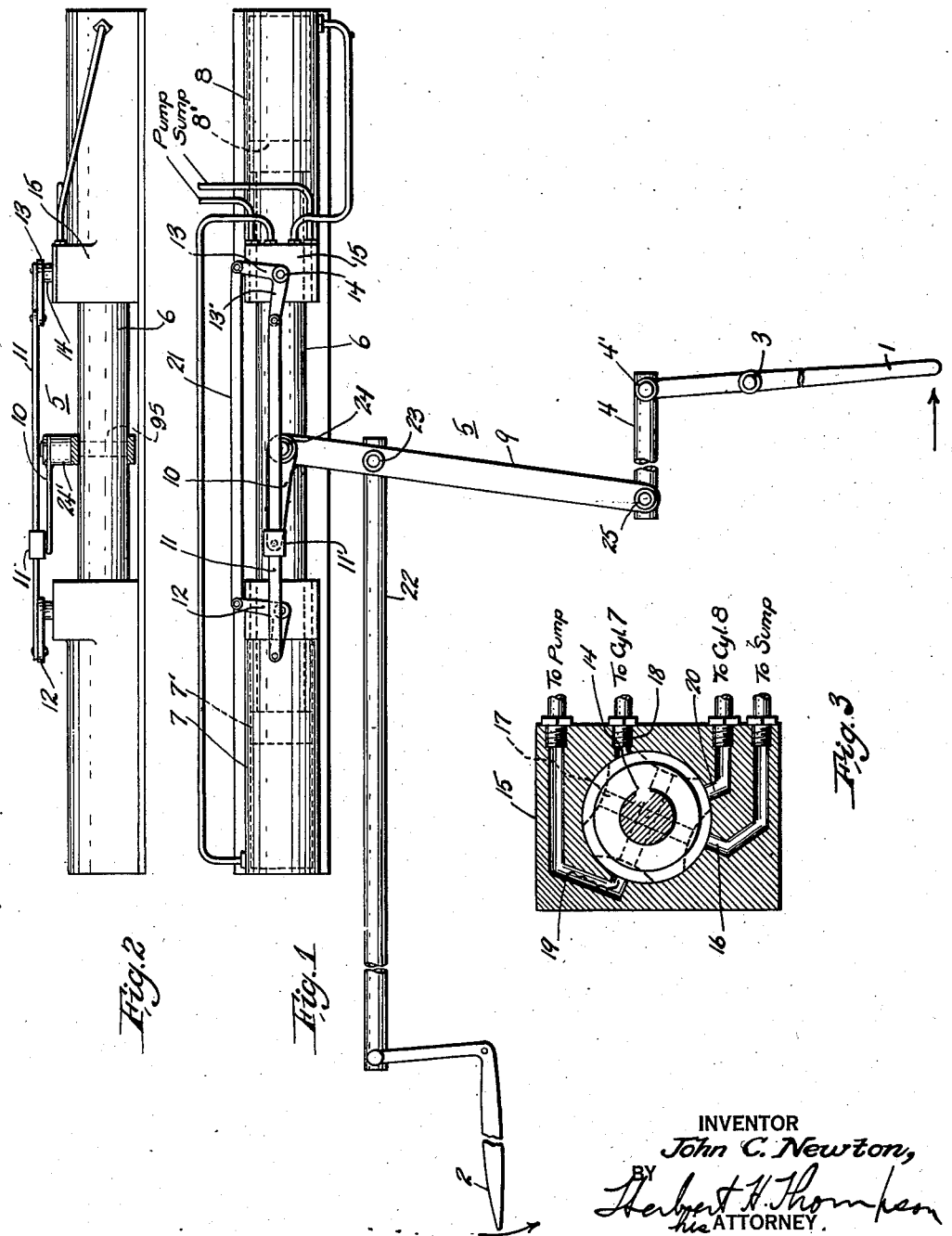

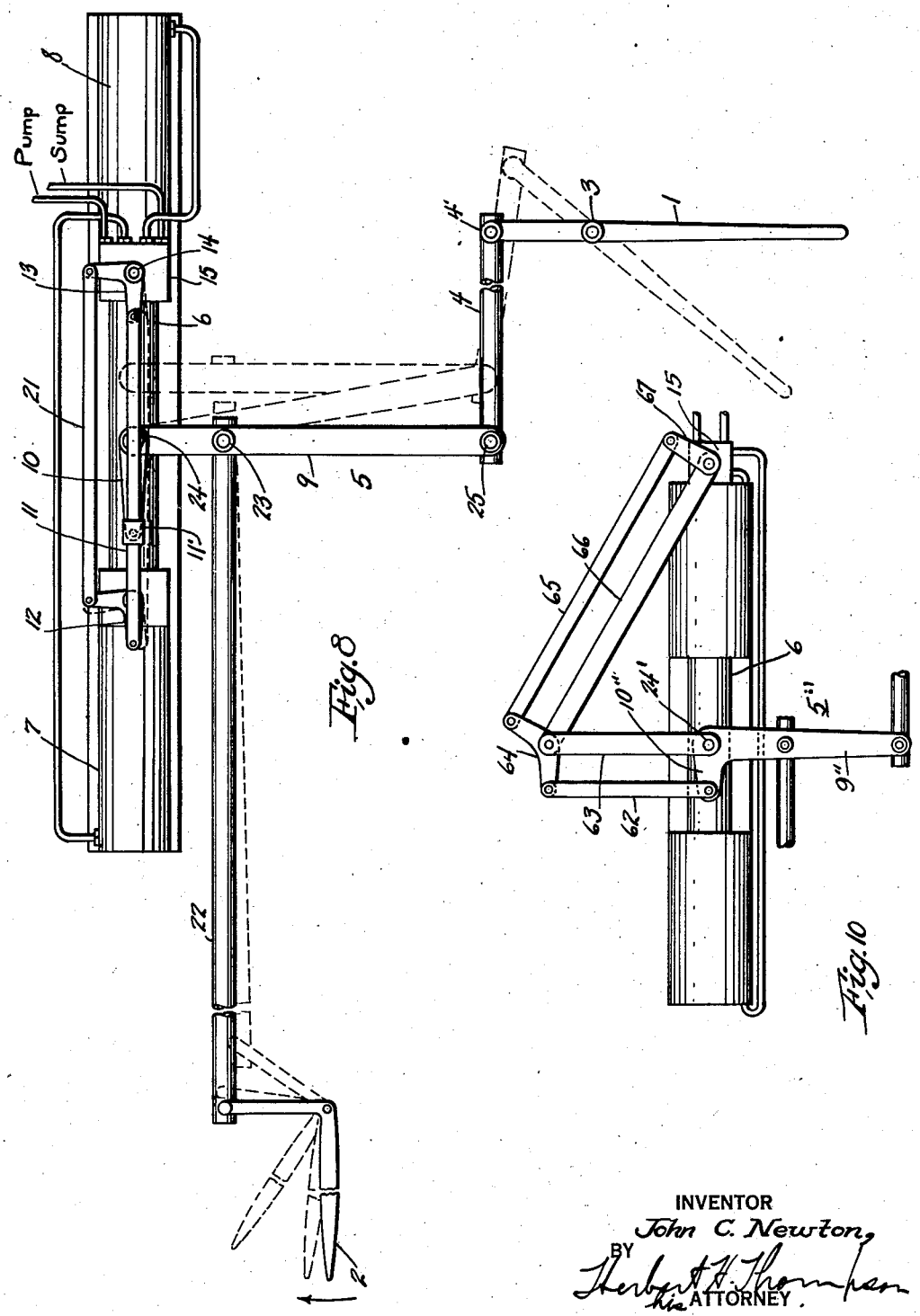

May 26, 1942.   J. C. NEWTON   2,284,298
SERVO SYSTEM FOR AIRPLANES AND OTHER VEHICLES
Filed Dec. 21, 1939   4 Sheets-Sheet 4
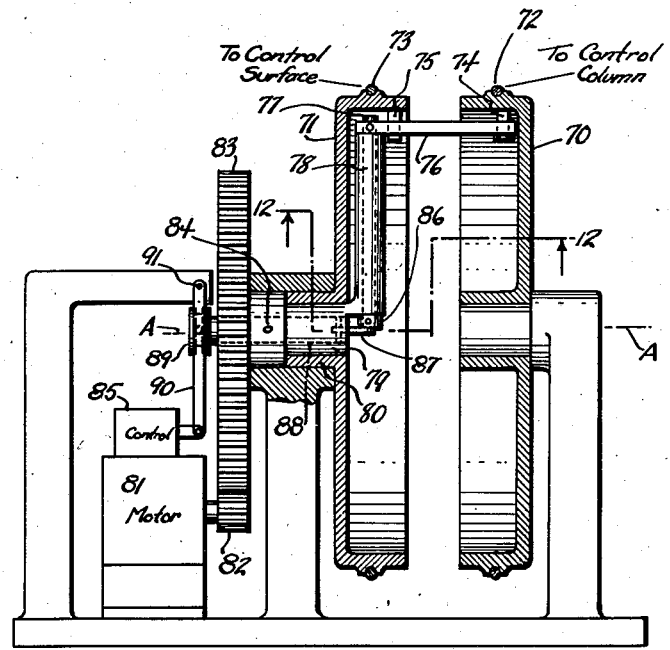
Fig. 11
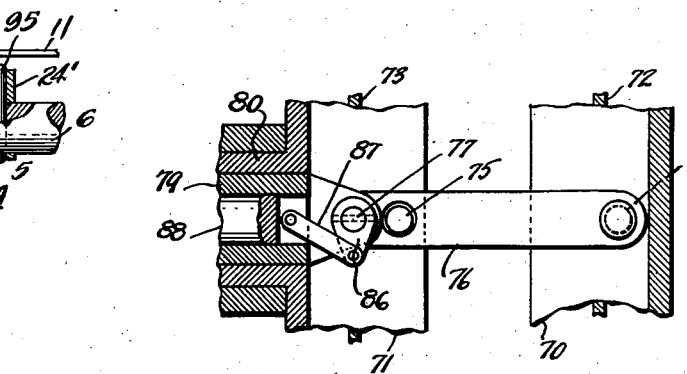
Fig. 2A
Fig. 12
INVENTOR
John C. Newton,
BY
Herbert H. Thompson
his ATTORNEY Patented May 26, 1942

2,284,298

UNITED STATES PATENT OFFICE 2,284,298

SERVO SYSTEM FOR AIRPLANES AND OTHER VEHICLES

John C. Newton, Bayside, N. Y.

Application December 21, 1939, Serial No. 310,353

7 Claims. (Cl. 121—41)

This invention relates to a servo motor or power multiplying system for relieving the operator of the greater portion of the manual labor of moving a control element on a dirigible vehicle, such as an airplane or motor car. It is now appreciated that in such a system, the natural movements and feel of the manually operated system which it aids should preferably be retained as largely as possible and, at the same time, complications involving the use of follow-back connections or special relays avoided. Especially is this true of the operation of the control surfaces on large aircraft. It is also important that in case of failure of the servo system, the operator may be able to move the control surface or device directly by hand and, preferably, without first performing any additional operation, simply by continuing to exert pressure on the same control device as is used when the servo system is operating. By my invention I achieve all of the above purposes with a simple mechanism and without employing any additional follow-back mechanisms, either hydraulic or mechanical.

My invention is also adapted for use in connection with automatic pilots for aircraft, especially to furnish the additional power needed for a large aircraft when the automatic pilot system thereon was designed for a smaller aircraft.

Further purposes accomplished by my invention will be apparent from the following description.

Referring to the drawings, showing several forms my invention may assume,

Fig. 1 is a diagrammatic plan view of my invention as applied to a hydraulic form of servo system for the control of one of the control surfaces in an aircraft.

Fig. 2 is a side elevation of the same, partly in section.

Fig. 2—A is an enlarged detail of a portion of Fig. 2, parts being in section.

Fig. 3 is a sectional view through one of the control valves.

Fig. 4 is a plan view of a modified form of the control with improved sensitivity.

Fig. 5 is a side view of the form of the same, partly in section.

Fig. 6 is a detail of a portion of Fig. 5 with the locking sleeve in a different position.

Fig. 7 is a sectional detail of the pin and slot connection between the rudder bar and hand operated sleeve of Fig. 5.

Fig. 8 is a plan view as in Fig. 1, but showing in full lines the neutral or normal position of the bell crank control lever and, in dotted lines, the first position which is opposite to that shown in full lines in Fig. 1, and the second or final position for a marked left turn.

Fig. 9 is a plan view showing a modified form of linkage connection between the control column, control surface and servo motor.

Fig. 10 shows still a further modification.

Fig. 11 is an elevation, partly in section, of a further modification showing a rotary servo motor, such as an electric motor instead of the hydraulic engines of the other forms.

Fig. 12 is a sectional detail taken on line 12—12 of Fig. 11.

Referring first to Fig. 1, I represents the primary impulse controller for the control device of the craft, in this case control surface 2, such as the rudder of an airplane. I may therefore represent the manual steering lever or column or a steering link controlled from a standard automatic pilot. Said lever is shown as pivoted at 3 and connected through link 4 to a bell crank lever 5 forming the main control lever of my servo motor. The lever 5 is shown as pivoted or pinned at 24 to the moved element of the servo, in this case the piston rod 6 of a double acting hydraulic servo motor, which may comprise two spaced single acting cylinders 7 and 8 with the piston rod 6 connecting the two pistons 7' and 8' thereof. Obviously, a single cylinder double acting piston may be employed, if desired. In its normal position, the laterally extending arm 9 of the bell crank lever is perpendicular to the piston rod 6, as shown in full lines in Fig. 8, and also in Fig. 4. The other arm 10 of the bell crank lever in this position is at substantially a right angle to the arm 9 and is linked at its left hand end to a slider I', on link II which pivotally connects the ends of a pair of small bell crank levers 12 and 13. One of said levers 12 or 13 is secured to the rotary valve stem 14 of distributing valve 15, which controls the flow of operating fluid to the cylinders 7 and 8.

The bell crank levers 12 and 13 are also connected at their other end by a link 21 to form a parallel linkage system.

In the normal or closed position, with the arm 9 in the position shown in full lines in Fig. 8, the valve lies in the position shown in Fig. 3, with the ports closed so that the system is locked. If, however, the valve is rotated a few degrees clockwise in Fig. 3, port 16, connected to the sump, will be connected through the channel 17 through the valve to the port 18 leading to cylinder 7, for instance. At the same time the pressure port 19 will be connected to the port 20 of the cylinder 8 to apply pressure thereto. On the other hand, a slight rotation in the counter-clockwise direction will effect the reverse connection of the pressure source and sump to the cylinders 8 and 7.

The connecting rod or other connecting means 22 to the control surface 2 is connected to an intermediate point 23 on the arm 9. This point is preferably nearer the pivot point 24 of the bell crank lever on the piston rod 6 than the pivot 25 on rod 4 so that a force multiplication is secured for the manual control, which may be further increased by the relative length of the lever 1 on the far side of pivot 3 as compared to its length between the pivot 3 and connection 4' to link 4. As shown, the two arms 9 and 10 of bell-crank 5 are secured to a sleeve 24' or hollow crank shaft journaled on cross pin 95 extending through the piston rod 6. Arm 9 is shown as forked to furnish a journal on both ends of pin 95.

The operation of the system so far described is as follows: In the position shown in full lines in Fig. 8, the system is locked and at rest. If the aviator desires to turn the rudder in the direction shown in Fig. 8, he moves the lever 1 clockwise. This causes a rotation of the bell crank lever 5 about the pivot 24 toward the first dotted position since the piston is at that time locked, thereby moving the point 23 slightly to the right. This causes a lowering of the link 11 and the consequent rotation of the bell crank lever 13 and its connected valve in the counter-clockwise direction to admit pressure oil to the cylinder 7, thereby causing the movement of the piston rod 6 to the right, carrying with it pivot point 24 and the bell crank lever 5. This movement results in a rotation of the bell crank lever 5 about the point 25 so as to move the rod 22 further to the right and restore the arm 9 to its perpendicular position, as shown in the second dotted line position, and at the same time again closes the ports of the valve 15 to maintain the rudder in the new position. Hence, the main force which moves the rudder is supplied from the servo motor system. In other words, the force applied to the rudder is divided between the servo motor and the control column in proportion to the ratio between the length of the arm 9 between the points 23 and 25 and the length between the points 23 and 24. Fig. 1 shows an intermediate position of the parts for counter-clockwise rudder movement.

Several important advantages of my invention will be apparent from the foregoing. One advantage is that although the servo system assists the aviator in moving the rudder, at the same time the aviator feels the resistance to movement of the control member 1 proportional to the resistance of the rudder to movement, since when the servo is acting, the lever 5 rotates about the point 25 as a pivot and hence exerts a reactive force on the handle 1 equal to the difference in forces exerted on the pin 24 and pin 23.

It should also be understood that although, in describing Fig. 8, three distinct steps are set forth, in practice the movements of the hydraulic pistons follow so closely the movements of the hand lever that the two occur practically together, and consequently the final movement of the rudder is at all times proportional to the displacement of the manual controller 1, and the force supplied to move the same is mainly furnished by the servo system in proportion to the leverage system adopted.

It is quite evident that the sensitiveness of the device may be increased by increasing the length of the arm 10 as compared to that of the arm 9 and also its length as compared to that of arm 13' of bell crank lever 13. Such a modification is shown in Figs. 4 and 5, in which the arm 10' is made longer than the arm 9' and arm 13' made shorter. This figure also shows how the rudder may be manually operated in case of failure of the valve 15 and the servo system. In this case, the manual lever 1' is linked at 4' to a sleeve 30 slidably mounted on the connecting rod 22' leading to the control surface 2'. Said sleeve is shown as loosely connected to the control rod 22' through a pin and slot connection 31 and 32, the sleeve being also linked to the arm 9' through a link 33. The arm 9' is again shown as pivoted at an intermediate point 23' to a laterally extending ear 34 on rod 22', and it also is pivoted on a pin 35 projecting through the piston rod 6' and also engaging a groove or keyway 35' in the framework supporting the cylinders 7 and 8 so as to prevent turning of the piston rod 6'. Preferably said pin is slightly below the link 11 in its normal position, the arm 10' extending at a slightly obtuse angle to the arm 9'. In this case, the bell crank levers 12' and 13' are again connected by a parallel link 21, but neither is mounted directly on the stem 14' of the valve, but 13' is shown as coupled to the valve stem 14' through a link 36 and arm 37, by which further amplification of movement is secured.

In this system (Figs. 4 and 5), as in the system of Figs. 1 and 8, the movement of the controller 1' is opposed by the proportional component of the resistance of the surface 2', since the sleeve 30 cannot rotate arm 9' around pivot point 35 without displacing pivot 23' and, therefore, displacing the rod 22' connected to the surface 2'. In this system provision is made so that if the hydraulic system fails, the surface may still be moved from the hand controller 1'. A limited motion may of course be effected directly, and further movement would be secured if the handle is moved far enough to bring the pin 31 to the end of the slot 32, thereby tying the sleeve 30 and the rod 22' together for direct movement by handle 1'. Such a movement presupposes lateral displacement of the link 9', including the pivot 35, and therefore freedom of movement of the pistons. Since valve 15' has been opened by the initial movement of controller 1', this would occur unless the fluid flow were blocked in the pump or piping.

As a further safety device and in order to avoid the lost motion present in the above described system when being operated entirely by hand and also to secure the full range movement under these conditions, I may provide a bypass valve 38 between the two working ends of the cylinders 7 and 8, which is preferably automatically opened when the aviator eliminates the lost motion device. For this purpose I have shown a sleeve or collar 40 rotatably but non-slidably mounted on the sleeve 30 adjacent the pin 31 and having a V-shaped slot 41 therein. When the open end of said slot is adjacent the pin 31, the servo motor is in operation and the lost motion device operative. To throw the lost motion device out of operation, the operator turns the collar 40 by a handle 50 to bring the V-notch 41 into engagement with the pin, thus eliminating the lost motion. At the same time, gearing is provided between the collar and the bypass valve 38 to open the same under these conditions, so that no resistance to movement of the handle 1' is interposed by the pistons. Such gearing is shown comprising a gear 43 on sleeve 40, which carries handle 50 and meshes with an elongated pinion 44 on the shaft of a bevel gear 45, meshing with a second bevel gear 46 on the shaft of the bypass valve 38.

Obviously, my invention may assume many different forms. In Fig. 9, the bell crank lever 5' is retained, but the arm 10", in this case, is formed as a segmental gear sector, the teeth 60 thereof loosely meshing with teeth on an elongated pinion 61 secured to the shaft of the valve 15'. The operation is therefore essentially the same since the lever 5' may move laterally with the piston 6 to which it is pivotally secured, without turning the valve, thus causing movement of the valve 15' only when pivotal movement takes place.

A still further modification is shown in Fig. 10. In this case, bell crank lever 5" may be constructed as before except that in this case, it is connected to the valve 15 through a double parallel linkage comprising links 62 and 63 pivoted adjacent the end of said arm and at the pivot point 24' on piston 6, respectively. Pivoted to the other end of said links is a bell crank lever 64 having two parallel links 65 and 66 pivoted thereto as shown, said links being connected at their outer ends to the arm 67 on the stem of the valve 15. An analysis of this linkage will show that movement of the piston alone will not effect movement of the valve but any rotation of the bell crank lever 5" about point 24' will rotate the valve as before. Action is, therefore, substantially the same as in the other figures.

An application of my invention to a rotary system is shown in Figs. 11 and 12. In this case, two drums 70 and 71 are shown mounted with their axes in a common line A—A, drum 70 being operated from a control column as by means of a cable 72, and drum 71 operating the control surface as by means of a cable 73. Each drum has an inwardly projecting pin 74 and 75 on the inner surface thereof, each of which enters loosely a hole in a cross lever 76 extending between the drums. The inner end of said lever is pinned to a shaft 77 journalled in the long sleeve 78 extending at right angles to the axis of rotation of the drums and secured to a sleeve 79 extending through the hollow hub 80 of drum 71. Shaft 77 may therefore revolve bodily about the axis A—A of the drums and may also turn on its own axis under the influence of the lever 76.

It will be seen that lever 76 operates on a similar principle to the bell crank lever 5 of the other forms of the invention, being pivotally connected at three points; (1) to the control at 74 column; (2) at an intermediate point 75 to the control surface; and (3) to a part (sleeve 78) driven from a servo motor, which in this case is a motor 81 turning through pinion 82, a large gear 83, the hub 84 of which is pinned to the sleeve 79 carrying sleeve 78.

In case of rotation of lever 76 about the axis of shaft 77, motion is transmitted to the controller 85 of the motor 81 in some suitable manner as by means of a small crank 86 pinned to the bottom of the shaft 77 and connected by link 87 to a rod 88 slidably and freely mounted within the sleeve 79. To the outer end of said shaft 88, is a channelled collar 89 which upon axial movement rotates a forked lever 90 about pivot point 91 to move the controller 85 of motor 81. A consideration of Figs. 11 and 12 will show that as long as drums 70 and 71 are moved together, lever 76 will be bodily moved, that is, translated, broadly speaking, and still maintain its normal position shown in Fig. 12, i. e., without being rotated about any one of the pivot pins 74, 75 or 77. When, however, the control column moves the drum 70 downwardly in Fig. 12, for instance, lever 76 will be rotated clockwise either about the present axis of shaft 75 if there is a heavy load on the drum 71, or about the present axis of shaft 77 in case there is little or no load on the drum. In either case, clockwise rotation of the lever 76 will turn the shaft 77 and thus operate the controller 85 through the linkage 86, 87, 90 and thus operate the motor 81 to rotate the gear 83 and sleeve 88, and with it the arm 78 in a downward direction in Fig. 12. This will continue until the lever 76 is again restored to its perpendicular position between the drums, as shown in Fig. 12. This mechanism therefore operates on the same general principles as the mechanism described in connection with the other figures, i. e., the lever is rotated about an axis intersecting the same for operating the control valve or other controller, but bodily movement or translation of the lever does not affect the controller. In this form of the invention, as in the form shown in Figs. 4 and 5, it is possible to move the controlled surface by hand from the hand control member 70 in case the servo motor fails, the lever 76 acting in this case as a link between members 70 and 71 to pull the latter around with the former as the former is rotated by hand.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In a servo motor system for vehicles, a servo motor for turning the steering or other control element thereof in either direction, a controller therefor movable in either direction from its standstill position to cause said motor to operate in either direction, a lever pivoted on a part movable with said motor, manual means for rotating said lever about said pivot point, said lever being also connected adjacent said pivot point to said steering element, and a connection between said lever and said controller permitting free translation or bodily movement of said lever with said part connected to said motor without affecting said controller, but causing movement of said controller upon rotation of said lever.

2. In a servo motor system for vehicles, a motor for turning the control surface in either direction, a controller therefor movable in either direction from its normal shut-off position to cause said motor to operate in one direction or the other, a bell crank lever pivoted on a part movable with said motor, manual means for moving said lever connected at a remote point to one arm of said lever, a near point on said lever being connected to the control surface, and a sliding connection between the arm of said lever and said controller, so constructed and arranged that said controller is not actuated on translation of the pivot point of said bell-crank but only upon angular displacement of said lever whereby, upon initial manual rotation of said lever, the controller is moved to operate the servo motor until said bell crank lever is displaced sufficiently to rotate about said remote point through an angle sufficient to return said controller to its shut-off position.

3. In a fluid servo motor system for vehicles, a fluid pressure motor for turning the control surface in either direction, an operating valve therefor movable in either direction from its normal shut-off position to cause pressure fluid flow in either direction to said motor, a bell crank lever pivoted on a part movable with said motor, manual means for moving said lever connected at a remote point to one arm of said lever, a nearer point on said lever being connected to the control surface, a connection between the other arm of said lever and said valve, so constructed and arranged that upon manual rotation of said lever, the valve is moved to operate the servo motor until said bell crank lever is displaced sufficiently to rotate about said remote point through an angle sufficient to close said valve, and a lost motion connection between said manual means and the connection to said control surface permitting hand operation on failure of the servo motor.

4. In a fluid servo motor system for vehicles, a fluid pressure motor for turning the control surface in either direction, an operating valve therefor movable in either direction from its normal shut-off position to cause pressure fluid flow in either direction to said motor, a bell crank lever pivoted on a part movable with said motor, manual means for moving said lever connected at a remote point to one arm of said lever, a nearer point on said lever being connected to the control surface, a connection between the other arm of said lever and said valve, so constructed and arranged that upon manual rotation of said lever, the valve is opened to operate the servo motor until said bell crank lever is displaced sufficiently to rotate about said remote point through an angle sufficient to again close said valve, and a normally detached coupling between said manual means and said steering element connection so constructed and arranged that when coupled, said lever is prevented from rotating and it and said connection are translated to turn the element by hand.

5. A servo motor system for vehicles as claimed in claim 4 having means for operating said coupling to render it operative and inoperative, and automatic means for bypassing said fluid motor when said coupling is rendered operative.

6. A power booster adapted for displacement through substantial angles in either direction and in which the hand controller moves with and supplies a portion of the power to move the load element, comprising a rotary servo motor for turning the load element in either direction through any desired angle, a controller therefor movable in either direction from its neutral position to cause said motor to operate in either direction, a driven member rotatable by said servo motor about an axis for turning said element, a coaxial member adapted for manual control, a bell-crank lever extending between said members, thereby rotating the latter from the former, said lever having its crank arm pivoted on said first member and extending radially thereof, and means slidable axially along the axis of said first member and linked to the inner end of said bell-crank lever for moving said controller, whereby the operator may cause movement of said element through said servo motor through any distance in either direction by maintaining the manual controller angularly ahead of said first member.

7. A power booster as claimed in claim 6, in which said bell-crank lever, in case of power failure, serve as a link between said two members whereby the load element may be driven directly from the manual control element in case of power failure.

JOHN C. NEWTON.